United States Patent Office 3,423,875
Patented Jan. 28, 1969

3,423,875
PROTECTION OF WOODY PERENNIALS
Gordon Bowker, P.O. Box 194,
Charleston, Tenn. 37310
No Drawing. Filed Sept. 29, 1965, Ser. No. 491,430
U.S. Cl. 47—2     4 Claims
Int. Cl. A01g 13/02

ABSTRACT OF THE DISCLOSURE

Extremes of temperature, sun scorch, frost, abrasions and similar damage often result in injury wounds and cavities in the phloem and xylem of stems, trunks and roots of trees and shrubs requiring treatment or protection. Many coatings have been applied to trees in such instances. By the use of papermaking pulp compositions the film thickness and life of the coating can be regulated.

---

This invention pertains to the provision of protective coatings for effectively treating, protecting, and insulating exposed portions of trees, shrubs, and similar woody perennials.

Many trees and shrubs are now grown commercially on an enormous scale to be transplanted at new growing sites. Some of these are even dug up in the fall and stored in sawdust until spring planting. This, of course, leads to tree injury. Trees and shrubbery are also injured during winter's extreme temperatures when it is impossible to draw sufficient moisture from the frozen ground to compensate for that evaporated by wind. During subfreezing weather internal cell damage may occur through the formation of ice crystals, with resultant cell-wall perforation. When the temperature goes below freezing after a warm day, the low temperature conditions frequently cause a distinct opening in the bark, noticeable in the spring when the sap flows. The consequences of frost are also evident in trunks of fruit trees, particularly citrus fruit trees. Extremes of temperature, sun scorch, radiation, frost, abrasions and similar damage, as well as transplanting, often result in injury, wounds and cavities in the phloem and xylem of stems and roots of trees and shrubs, requiring treatment or protection. In addition, there is almost inevitable damage to branches, trunk and bark due to fungi, insects, mechanical injury, or deliberate pruning. Damage to trees, shrubs, and the like are thus frequently responsible for serious losses.

Many coating compositions have been applied to trees and plant life to prevent drying out of the stock, prevent winter injury, check rapid temperature changes, prevent sun scald, and other injuries and otherwise stabilize trunk temperatures. Other compositions have been used to protect roots so as to overcome the problem of transplanting trees and shrubs without digging up a ball of earth surrounding the roots. Compositions are also used for protection against the very probable damage to branches or limbs due to required pruning.

In many cases, the environmental changes have been dealt with by treating the trees and shrubs with protective films of a relatively impervious nature by the use of oils, paints, and waxes. Oils and paints present a toxicity problem; whereas, if waxes are applied too hot, injury may result. Latexes and plastics have also been used. However, only thin films result from their use. Emulsions and solutions of high polymers are also deposited in thin films. To such extent that insulation is provided, the coated bark areas are protected.

This invention has as one of its objects the provision of a composition for application to trees and shrubs to prevent injuries of the bark due to weather extremes. Another object is to provide a tree or shrub protecting composition wherein the film thickness and life of the protective coating can be regulated. Still another object of the invention relates to the insecticidal and medicinal treatment of bark of woody plants.

In a broad sense, the essence of the present invention resides in the discovery that pulp compositions lend themselves remarkably well to the coating of portions of trees, bushes, and shrubs. The invention thus contemplates as an aqueous composition for protecting trunks, branches and roots of trees and shrubs from damage resulting from weather extremes, insects or disease, a suspension of papermaking pulp. By "papermaking pulp suspension" is meant the pulp used in the manufacture of paper, to which water has been added to reduce solids to less than a solids content of thirty to thirty-five percent. Pulp for paper manufacture includes pulps not only of vegetable origin; for example, wood, rag, cotton linters, wastepaper, esparto, straw, and the like, whether mechanical, chemical, or chemi-mechanical high yield pulps, such as sulphate, sulphite or soda pulps, but also mineral, animal and synthetic pulps, for instance asbestos, glass, rock wool, animal wool pulps, etc.

In a preferred embodiment this invention contemplates a suspension contining about 0.1 to 5 percent fibers of such consistency that it can be sprayed. In this aspect the pulp fibers preferably will be of a shorter variety, for example, fibers of broadleaf woods. Coniferous woods will be somewhat more difficult to spray. Mineral and synthetic fibers of a comparable length will also be used, fiber length depending upon spray equipment.

One of the advantages of this invention is that, while the spray composition is preferred for ease of application, the film thickness can be regulated to fulfill the end requirement. Thus coatings thicker than those frequently employed can be applied. Paper pulp is generally stored at about fifteen percent solids. While these suspensions are difficult to pump, they nevertheless provide excellent thick coatings. Where maximum protection is desired, even thicker compositions up to thirty-five percent solids can be applied by other means. Normally, however, readily applicable compositions will be pulp suspensions at 0.1 to 10 percent solids and with average fiber lengths of 0.1 to 7 millimeters.

In addition to controlling the thickness of the coating, the length of time the coating will last can also be regulated. This is accomplished by the use of an aqueous binder. Thus water soluble synthetic binders such as polyvinyl acetate, the lower molecular weight acrylates, maleates and the like can be incorporated into the composition. Casein and starch can also be used. The quantity and type of binder will determine the permanence of the applied coating, but normally it will be less than 20 weight percent based on the total composition.

As an example of a method of carrying out the process of this invention the following is given.

EXAMPLE 1

A paper pulp suspension obtained from a mill employing a mechanical pulp process is so diluted that solids content of the suspension is five percent. Ten percent casein is added as a binder. The composition when applied to the trunks of orange trees is an effective frost damage preventive.

EXAMPLE 2

The paper pulp suspension of Example 1 is further diluted to form a one percent solids composition without the casein. Its application to grape vines provides good resistance to cold weather.

Besides effectively protecting trunks and limbs from cold and sun, the compositions of this invention lend themselves to modification for use in dressing cavities, wounds, injuries and the like of stems or roots. For this use various additives can be added to the pulp, particularly chemicals with insecticidal, fungicidal and nutritive additives, for example, DDT, asphalts, sulfur compounds, naphtha, lime, potash, arensates and the like. In addition, thickeners, bituminous emulsions and other additives can be incorporated into the composition. These additives, like the binders mentioned herein, will be employed in minor amounts, the end result governing this quantity as is well known. These and other modifications and ramifications are deemed to be within the scope of the invention.

What is claimed is:

1. A process for insulating trunks and branches of trees and shrubs for their protection from weather injury caused by environmental changes and from damage by abrasion caused by transplanting and pruning which comprises coating the exposed portion to be insulated with an effective amount of a pulp suspension derived from a paper-making process, diluted with sufficient water for application consistency within the range of 0.1 to 35 percent pulp solids.

2. The process of claim 1 wherein the pulp is a mechanical pulp.

3. The process of claim 1 wherein the pulp is a chemical pulp.

4. The process of claim 1 wherein the pulp contains an aqueous binder.

References Cited

UNITED STATES PATENTS

| 1,425,257 | 8/1922 | Hockridge | 47—23 |
| 1,871,050 | 8/1932 | Eveland | 47—9 |
| 1,962,806 | 6/1934 | Clapp | 47—9 |
| 1,995,853 | 3/1935 | Hunsaker | 47—58 |
| 3,129,529 | 4/1964 | Rumsey et al. | 47—2 |

FOREIGN PATENTS 690,361    7/1964    Canada.

OTHER REFERENCES

Brecht et al.: "The Influence of Frost on Halfstuff and Paper" (1941), CA 36, pp. 5345–46 (1942).

Spulnik et al.: "Effect of Waste Sulfite Liquor on Soil Properties and Plant Growth" (1939), Soil Science, 49, pp. 37–47 (1940).

LEWIS GOTTS, *Primary Examiner.*

G. HOLLRAH, *Assistant Examiner.*

U.S. Cl. X.R.

71—79, 80